US008562471B2

(12) United States Patent
Savagian et al.

(10) Patent No.: US 8,562,471 B2
(45) Date of Patent: Oct. 22, 2013

(54) ELECTRIC MOTOR ASSEMBLY WITH MOVABLE ROTOR SEGMENTS TO REDUCE BACK ELECTROMOTIVE FORCE

(75) Inventors: Peter J. Savagian, Bloomfield Hills, MI (US); Alan G. Holmes, Clarkston, MI (US); Mark A. Theobald, Bloomfield Hills, MI (US)

(73) Assignee: GM Global Technology Operations LLC, Dtroit, MI (US)

( * ) Notice: Subject to any disclaimer, the term of this patent is extended or adjusted under 35 U.S.C. 154(b) by 253 days.

(21) Appl. No.: 13/086,524

(22) Filed: Apr. 14, 2011

(65) Prior Publication Data

US 2012/0264554 A1 Oct. 18, 2012

(51) Int. Cl.
*F16H 48/06* (2006.01)

(52) U.S. Cl.
USPC ............................ 475/149; 310/112; 310/114

(58) Field of Classification Search
USPC .................................... 310/112, 114; 475/149
See application file for complete search history.

(56) References Cited

U.S. PATENT DOCUMENTS

| 5,680,837 | A | 10/1997 | Pierik |
| 6,462,430 | B1 | 10/2002 | Joong et al. |
| 6,577,022 | B2 | 6/2003 | Joong et al. |
| 6,833,646 | B2 | 12/2004 | Joong et al. |
| 7,608,962 | B2 * | 10/2009 | Franke .......................... 310/114 |
| 7,642,683 | B2 * | 1/2010 | Powers et al. .................. 310/114 |
| 7,671,500 | B2 * | 3/2010 | Masuda et al. ................. 310/112 |
| 8,004,138 | B2 * | 8/2011 | Iwata et al. ..................... 310/114 |
| 2006/0144357 | A1 * | 7/2006 | Knecht et al. ............... 123/90.17 |
| 2007/0074691 | A1 * | 4/2007 | Kinugawa et al. ......... 123/90.17 |
| 2010/0064997 | A1 | 3/2010 | Ai |

OTHER PUBLICATIONS

Xiaolan Ai, Matthew Wilmer and Donald Remboski, Electrical Variable Cam Phase Shifter for Internal Combustion Engine, SAE Technical Paper Series 2008-01-1351, Apr. 14-17, 2008, SAE International Warrendale PA.
Caricci, Permanent Magnet, Direct-Drive, Starter/Alternator Machine with Weakened Flux Linkage for Constant-Power Operation Over Extremely Wide Speed Range, 2001 institute of Electrical & Electronics Engineers, Inc. (IEEE), 0-7803-7116-X/01, pp. 1626-1633.

* cited by examiner

*Primary Examiner* — Justin Holmes
(74) *Attorney, Agent, or Firm* — Quinn Law Group, PLLC (57) ABSTRACT

An electric motor assembly includes a rotor hub, and a rotor supported on the rotor hub. The rotor hub has first and second hub portions, and the rotor has first and second annular rotor segments supported for rotation on the respective first and second hub portions. Each of the rotor segments has a respective set of magnets spaced circumferentially therearound. The rotor hub and the rotor segments are configured so that at least one of the rotor segments moves about the axis of rotation relative to the other of the rotor segments as the rotor hub rotates. The movement of the at least one of the rotor segments is an amount that increases as the speed of the rotor hub increases to reduce back electromotive force. The movement may be due to centrifugal force, which increases as speed increases, without requiring a control system to effect the movement.

18 Claims, 5 Drawing Sheets

100 # ELECTRIC MOTOR ASSEMBLY WITH MOVABLE ROTOR SEGMENTS TO REDUCE BACK ELECTROMOTIVE FORCE

TECHNICAL FIELD

The invention relates to an electric motor assembly.

BACKGROUND

Some electric motor/generators are referred to as permanent magnet motors. Such motors have a stator with windings carrying three-phase alternating current that creates an electromotive force to turn a rotor that has permanent magnets. At the same time, the rotating magnetic fields of the permanent magnets generate a "back electromotive force" in the windings. The so-called back electromotive force is a voltage opposing the voltage in the stator windings. The magnetic field strength and back electromotive force acting on each phase of the stator winding varies sinusoidally with the rotational position of the rotor. The average value of the back electromotive force is proportional to the rotational speed of the rotor. At low speed conditions, the voltage produced within the windings by the back electromotive force is relatively low, and the back electromotive force will be insignificant in comparison to the input voltage. At high output speed, the voltage produced within the windings by the back electromotive force is relatively high, and significant in comparison to the maximum voltage that can be applied to the windings, so that little or no current will flow in the windings without reduction of the magnetic field of the rotor. Typically, a field weakening current is applied to the stator windings to suppress the magnetic field and back electromotive force, so that torque-producing current will flow or flow more freely through the windings at high rotor speeds. Mechanical reduction of back electromotive force, especially during high speed conditions could significantly improve the efficiency of the motor/generator by reducing or eliminating the need for field-weakening currents through the stator windings, so that all currents flowing through the stator windings are for the production of torque and therefore useful work.

SUMMARY

By dividing the rotor of a radial-flux motor into axial portions or segments, each having a set or sets of permanent magnets, and at least one of which can move (i.e., be skewed or phased) about the axis of rotation relative to the others, the magnets will be offset from one another by an increasing amount as the common rotational speed of the rotor portions increases. Offsetting the magnets from one another reduces the amplitude of the sinusoidal variation in magnetic field strength and back electromotive force generated by the rotating magnets. The reduction in back electromotive force allows reduction or elimination of the field weakening currents that must be applied and therefore increases motor efficiency.

An electric motor assembly is provided that includes a stator with electrical windings and a rotor assembly that is rotatable about an axis of rotation. The rotor assembly has a rotor hub, and a rotor supported on the rotor hub. The rotor hub has first and second rotor hub portions. The rotor has first and second annular rotor segments, with the first annular rotor segment supported for rotation with the first rotor hub portion and the second annular rotor segment supported for rotation with the second rotor hub portion. Each of the rotor segments has a respective set of magnets spaced circumferentially therearound. The rotor hub and the rotor segments are configured so that at least one of the rotor segments moves about the axis of rotation relative to the other of the rotor segments as the rotor hub rotates. The relative movement of the at least one of the rotor segments is an amount that increases as the speed of the rotor hub increases to reduce back electromotive force. The movement may be produced by harnessing centrifugal force, which increases as speed increases, without requiring a control system to effect the movement.

The electric motor assembly may be configured with various embodiments of phasing mechanisms to establish the relative movement of one of the rotor segments. For example, a hydraulically-actuated vane-type phaser, a hydraulically-actuated helical gear phaser, or a phaser that uses centrifugal masses and meshing gears may be used. In each of these embodiments, actuation of the phaser may be entirely passive, in that it relies only on the rotation of the rotor to cause actuation of the phaser, with the amount of phasing increasing as speed increases.

The above features and advantages and other features and advantages of the present invention are readily apparent from the following detailed description of the best modes for carrying out the invention when taken in connection with the accompanying drawings.

DETAILED DESCRIPTION

Figure 1:
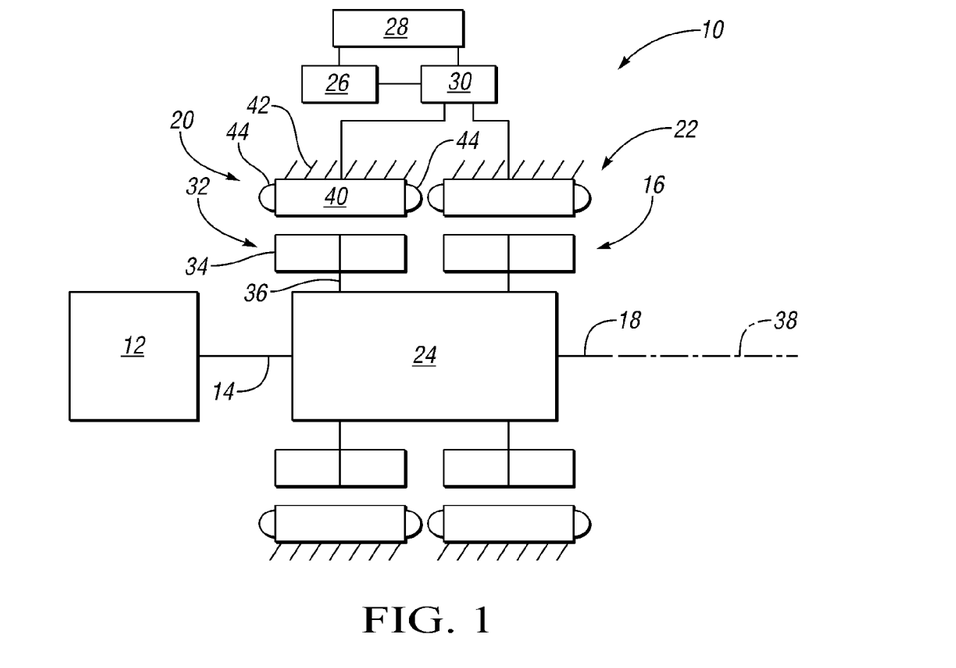
FIG. 1 is a schematic illustration of a first embodiment of a powertrain having an electric motor assembly within the scope of the invention.

Referring to the drawings, wherein like reference numbers refer to like components throughout the several views, FIG. 1 shows an example of a powertrain 10 that includes an engine 12 operatively connected to an input member 14 of a transmission 16 to provide power at an output member 18 of the transmission 16. The powertrain 10 may be a vehicle powertrain, with the output member 18 connected to vehicle wheels to provide tractive force at the wheels. The transmission 16 is an electromechanical hybrid transmission with two electric motor assemblies 20, 22 connected to different members of a gearing arrangement 24 included in the transmission 16. The electric motor assemblies 20, 22 are referred to herein as motor/generators 20, 22, as they may be controlled by a controller 26 to be operated as either motors or generators in various modes of operation of the transmission 16. Within the scope of the claimed invention, a powertrain may alternatively have only one motor/generator.

The controller 26 is connected to an energy storage device, such as a battery 28, and controls the flow of power from the battery 28 to one or both of the motor/generators 20, 22 through a power inverter 30 when the motor/generator 20 and/or 22 operates as a motor, and controls the flow of power from one or both of the motor/generators 20, 22 to the battery 28 via the power invertor 30 when the motor/generator 20 and/or 22 is controlled to operate as a generator.

The motor/generators 20, 22 are substantially similar in structure and design. Accordingly, motor/generator 20 is described in further detail, and the description applies equally to motor/generator 22. Motor/generator 20 has a rotor assembly 32 that includes a rotor 34 mounted on a rotor hub 36 that is connected to a member of the gearing arrangement 24 such that the rotor assembly 32 is rotatable about an axis of rotation 38, which in this embodiment is the same as the axis of rotation of the input member 14 and the output member 18. The rotor 34 is a permanent magnet rotor that has sets of magnets distributed about its circumference, as further described below and shown in FIGS. 2 and 3. In order to reduce back electromotive force that occurs with permanent magnet-type rotors, the rotor hub 36 and the rotor 34 are each divided into multiple axial portions and are configured to allow at least one of the portions to be phased relative to the others, as further described below. The motor/generator 20 also has a stator 40 that is mounted to a stationary (i.e., nonrotating) member 42, such as a casing of the transmission 16. Electrical windings 44 extend between the two axial ends of the stator 40.

Figure 2:
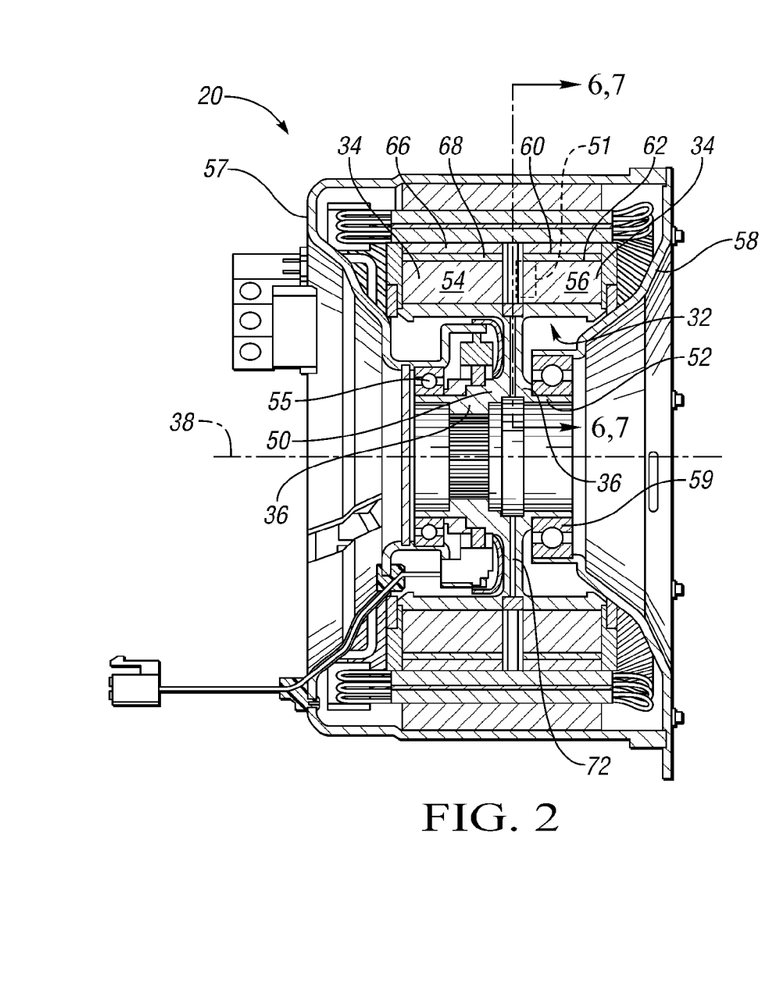
FIG. 2 is a more detailed schematic cross-sectional illustration of the electric motor assembly of FIG. 1.

Referring to FIG. 2, the motor/generator 20 is shown in greater detail. In the embodiment shown, the rotor hub 36 includes a first rotor hub portion 50 and a second rotor hub portion 52. The rotor 34 includes a first rotor portion 54 supported for rotation with the first rotor hub portion 50, and a second rotor portion 56 supported for rotation with the second rotor hub portion 52. The rotor portions 54, 56 are also referred to herein as rotor segments. The rotor portions 54, 56 and the hub portions 50, 52 are slightly axially spaced from one another. Bearing 55 allows rotation of the rotor hub portion 50 relative to motor housing 57, and bearing 59 allows rotation of the rotor portion 56 relative to an end cover 58.

Figure 3:
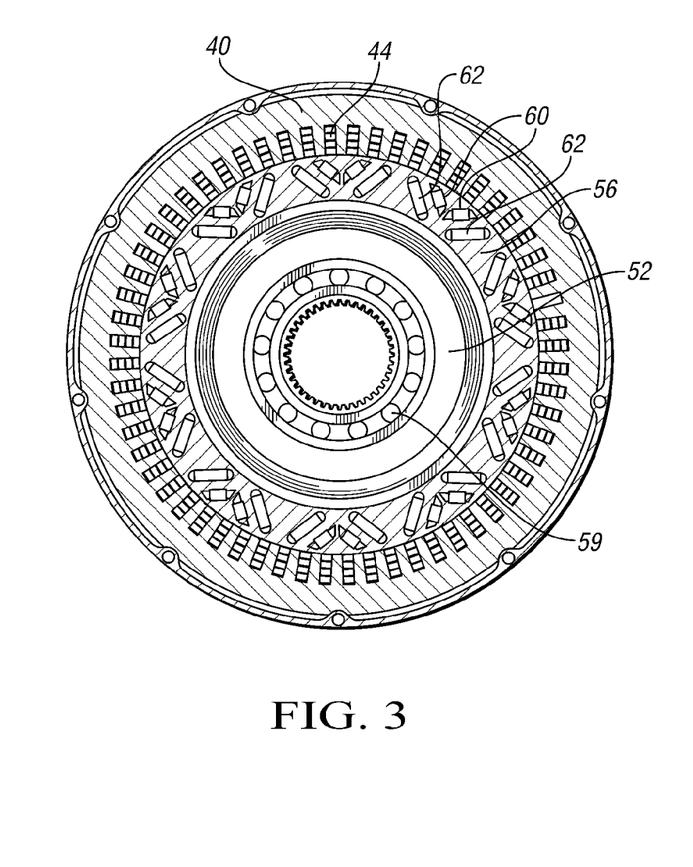
FIG. 3 is a schematic cross-sectional illustration in end view of the electric motor assembly of FIG. 2 with an end cover removed.

As shown in FIG. 3, in which an end cover 58 (see FIG. 2) of the motor/generator 20 is removed, the rotor portion 56 has sets of magnets 60, 62 distributed about its circumference. Current running through the windings 44 of the stator 40 creates a magnetic force alternately attracting and repelling the magnets 60, 62. The magnetic force creates a torque to turn the rotor portion 56. Additional sets of magnets 66, 68 shown in FIG. 2 are distributed about the circumference of rotor portion 54. The sets of magnets 66, 68 are arranged relative to one another in the same skew pattern as the sets of magnets 60, 62 are arranged. Current running through the windings 44 of the stator 40 creates a magnetic force alternately attracting and repelling the magnets 66, 68. The magnetic force creates a torque to turn the rotor portion 54. Because the sets of magnets 60, 62 are substantially identical to the sets of magnets 66, 68, the current that runs through windings 44 causes the portions 54, 56 to rotate at the same speed, even though axially separated from one another.

Figure 4:
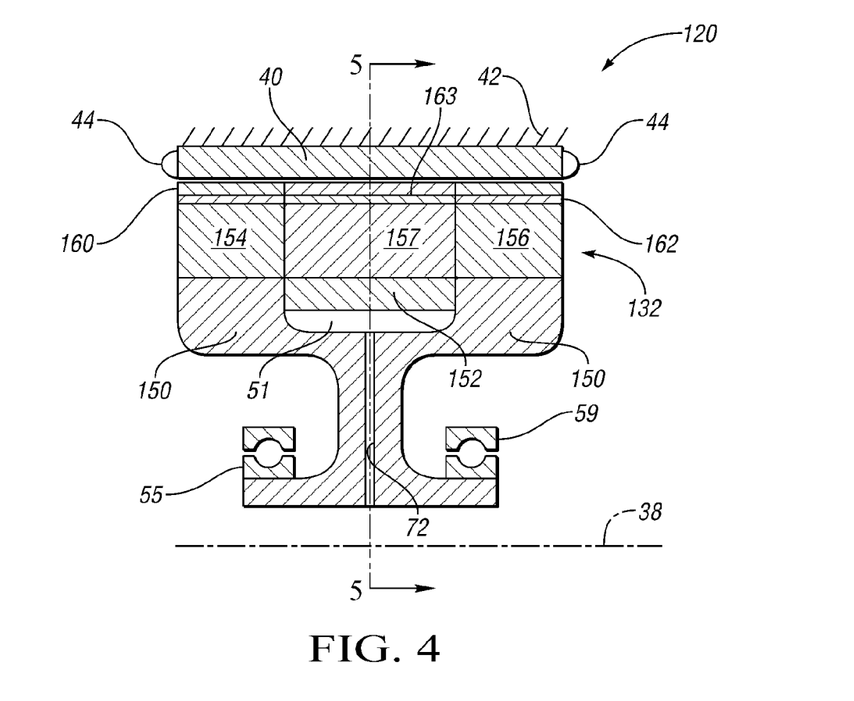
FIG. 4 is a schematic fragmentary cross-sectional illustration of another embodiment of an electric motor assembly within the scope of the invention that may be used in the powertrain of FIG. 1.

In other embodiments, the motor/generators 20, 22 of FIG. 1 may have more than two rotor portions. For example, as shown in FIG. 4, the motor/generators 20, 22 of FIG. 1 may be replaced by motor/generators similar to motor/generator 120 that has a rotor assembly 132 with three rotor portions 154, 157, and 156, also referred to herein as rotor segments, with a center rotor portion 157 that is movable about the axis of rotation 38 relative to rotor portions 154, 156 on either axial side of the center rotor portion 157. The motor/generator 120 has a first rotor hub portion 150, which supports two of the rotor portions 154 and 156, and a second rotor hub portion 152, which supports the center rotor portion 157. Each of the rotor portions 154, 156, 157 has a respective set or sets of magnets 160, 162, 163 spaced about its circumference.

Figure 5:
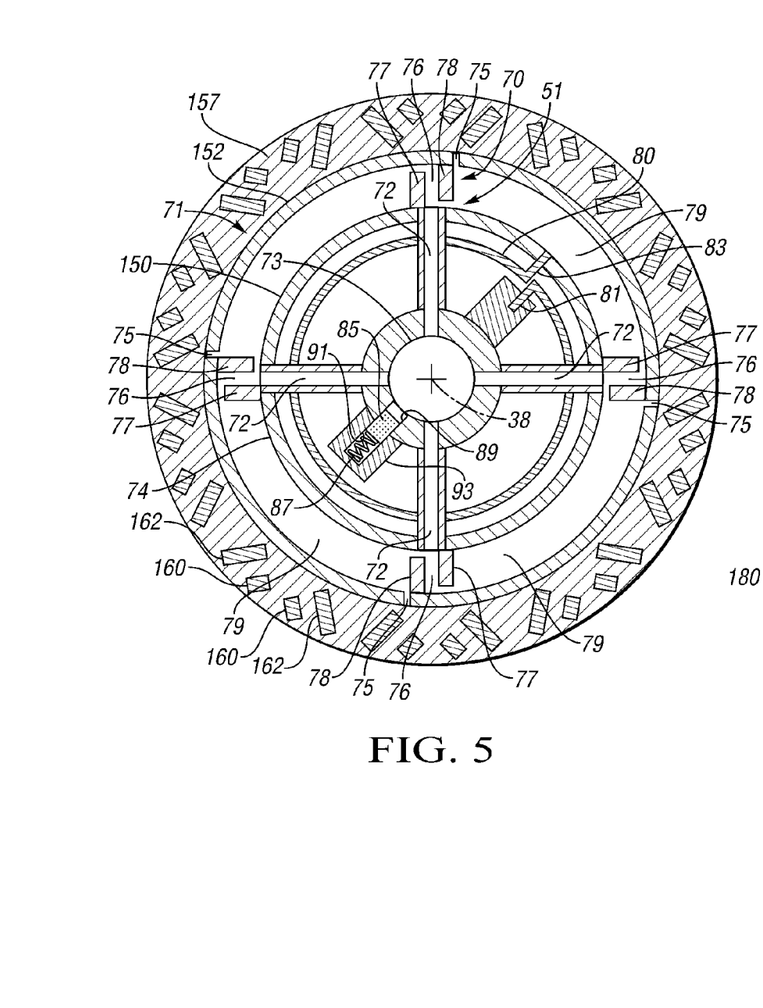
FIG. 5 is a schematic cross-sectional illustration of the electric motor assembly of FIG. 4 taken at the lines 5-5 with a first embodiment of a phasing mechanism.
Figure 6:
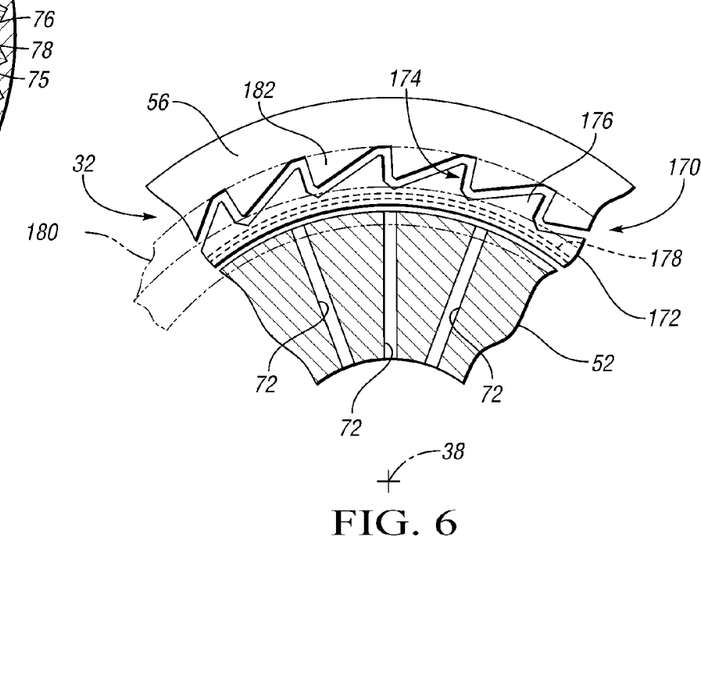
FIG. 6 is a schematic cross-sectional illustration of the electric motor assembly of FIG. 2 taken at the lines 6-6 with a second embodiment of a phasing mechanism.

In either embodiment, the rotor assembly 32 or 132 is configured with a phasing mechanism 51 that allows one of the rotor portions (rotor portion 56 in FIG. 2 and rotor portion 157 in FIG. 4) to move about the axis of rotation 38 relative to the other rotor portions. The movement, also referred to as angular skewing or phasing, is accomplished passively (i.e., without a control system) due to centrifugal force, and increases in magnitude as the speed of the rotor assembly 32 or 132 increases. The increased skewing with increased rotor speed better reduces the back electromotive force that otherwise tends to increase with increasing rotor speed. In the embodiments shown in FIGS. 5-8, the relative movement occurs due to centrifugal force, without a control system. For instance, this centrifugal force may act on fluid in a radial channel 72 formed in rotor hub portion 150 as shown in FIG. 5 or in rotor hub portion 52 as shown in FIG. 6 to build up hydraulic pressure to operate the phasing mechanism 51. Alternatively, the relative movement may result from a controlled actuating mechanism, such as to control hydraulic pressure to cause the movement. For example, controlled hydraulic pressure may be supplied to the end of the fluid channel 72 near the axis of rotation 38.

Referring to FIG. 5, in a first embodiment, the phasing mechanism 51 of FIGS. 2 and 4 may be a vane-type hydraulic phaser 70. FIG. 5 shows the phaser 70 in the rotor assembly 132 of FIG. 4, but would be equally installed in the rotor assembly 32 of FIG. 2 to phase rotor portions 54, 56. In FIG. 5, the rotor hub portion 150 has a plurality of radial channels 72 that permit hydraulic fluid to flow from the inner diameter 73 of the rotor hub portion 150 to the outer diameter 74 of the rotor hub portion 150. At the outer diameter 74, a cavity 76 extends between the outer diameter 74 and the inner diameter of the rotor hub portion 152. A first set of vanes 77 extend from the outer diameter 74 partway into the cavity 76. A second set of vanes 78 extend from the inner diameter 71 of the rotor hub portion 152 partway into the cavity 76. The vanes 77, 78 are interleaved with one another and may extend partially or completely around the outer circumference of the rotor hub portion 150 and the inner circumference of the rotor hub portion 152. As the rotor assembly 132 spins, hydraulic fluid is forced radially outward through the channels 72 into the cavity 76 due to centrifugal force. The fluid may access the channels 72 through passages in the transmission member on which the rotor hub portion 150 is splined or otherwise mounted for rotation. The vanes 77, 78 and fluid channels 72 are arranged so that the increased fluid pressure in the cavity 76 tends to move the rotor hub portion 152, and the rotor portion 157, attached thereto, clockwise relative to the rotor hub portion 150 in FIG. 5. Spaces 79 between the oil chambers 76 have small vents 75 to the rim of the rotor hub portion 152 that allow some of the fluid in spaces 79 to move into the vents 75 during the relative movement or phasing of the rotor hub portions 150, 152 to prevent the accumulation of the fluid, such as oil, in the spaces 79, which would oppose the phasing motion. As the speed of the rotor assembly 132 decreases, centrifugal force decreases so that the fluid returns radially inward through the channels 72 and the skewing or phasing decreases.

A torsional return spring 80 with ends 81 and 83 is mounted between the rotor hub portions 150 and 152 and is biased to exert a force between them to return the vanes 78 to a predetermined spacing relative to the vanes 77 when the rotational speed of the rotor assembly 132 is at or below a predetermined speed. In this manner, the spring 80 prevents movement of the rotor hub portion 152 relative to the rotor hub portion 150 of FIG. 4 until fluid pressure is sufficient to overcome the force exerted by the spring 80 on the rotor hub portions 150 and 152. The spring 80 is configured so that the spring force ensures that relative phasing of the rotor hub portions 150 and 152 to reduce back electromotive force does not occur until the rotational speed of the rotor assembly 132 (and therefore the hydraulic pressure in the cavity 76) reaches a predetermined minimum level.

A locking pin 85 is also provided, which, when engaged by a spring 87, locks rotor hub portion 152 at a predetermined position relative to rotor hub portion 150 by extending into hole 89 in rotor hub portion 150 and hole 91 in a block 93 attached to rotor hub portion 152. The block 93 is attached to the rotor hub portion 152 at a different axial location not shown in the cross-section of FIG. 5. The locking pin 85 as shown in FIG. 5 is acted upon both by centrifugal force, so that it unlocks when the rotor hub portions 150, 152 reach a predetermined rotational speed, and by the force of a return spring 87. The hole 89 for the locking pin 85 as shown in FIG. 5 extends to the inner diameter of the rotor hub portion 150, which allows any hydraulic pressure applied to the channels 72 to also act upon the locking pin 85. The locking pin 85 can therefore prevent any motion, including response to rotor vibration, between the center rotor portion 157 and the other rotor portions 154 and 156, at low speeds, when rotor torque may reach its greatest values.

Although illustrated with respect to the rotor assembly 132, the vane-type phaser 70 could be installed as the phasing mechanism 51 in the rotor assembly of FIG. 2. In FIG. 5, the vanes 78 would then extend from rotor portion 56 rather than rotor hub portion 152 so that rotor portion 56 would be passively phased relative to the rotor portion 54 by the hydraulic pressure.

FIG. 6 shows a phaser 170 that could be used as the phasing mechanism 51 in FIGS. 2 and 4 and is illustrated with respect to the rotor hub portion 52 of FIG. 2. An annular piston 172 is splined to the rotor hub portion 52 and can move axially thereon when fluid pressure is applied to its surface 174. The piston 172 has external helical gear teeth 176. The piston 172 is urged to a predetermined axial position by a spring 178 (shown only in phantom behind the piston 172). When hydraulic pressure from the channels 72 empties into a cavity 180 adjacent the teeth 176 (forward of surface 174 in FIG. 6) and acts against the surface 174, the piston 172 moves axially along internal helical teeth 182 splined to or formed on the rotor portion 56. The helical shape of the teeth 176, 182 causes the rotor portion 56 to move about the axis of rotation 38 when the piston 172 moves axially, skewing the rotor portion 56 relative to the adjacent rotor portion 54 of FIG. 2. The helical teeth 176, 182 and the movable piston 172 form an adjustable mechanical link. The phasing is accomplished via fluid pressure that can be passively created by centrifugal force, increasing as the speed of the rotor hub portion 52 increases, or that can be controlled via a fluid control solenoid that feeds the fluid into the cavity 180 adjacent the faces of the teeth 176, 182. Although shown and described with respect to the rotor assembly 32, the phaser 170 could equally be used with the rotor assembly 132 of FIG. 4 to skew the rotor portion 157 relative to the rotor portions 154 and 156.

Figure 7:
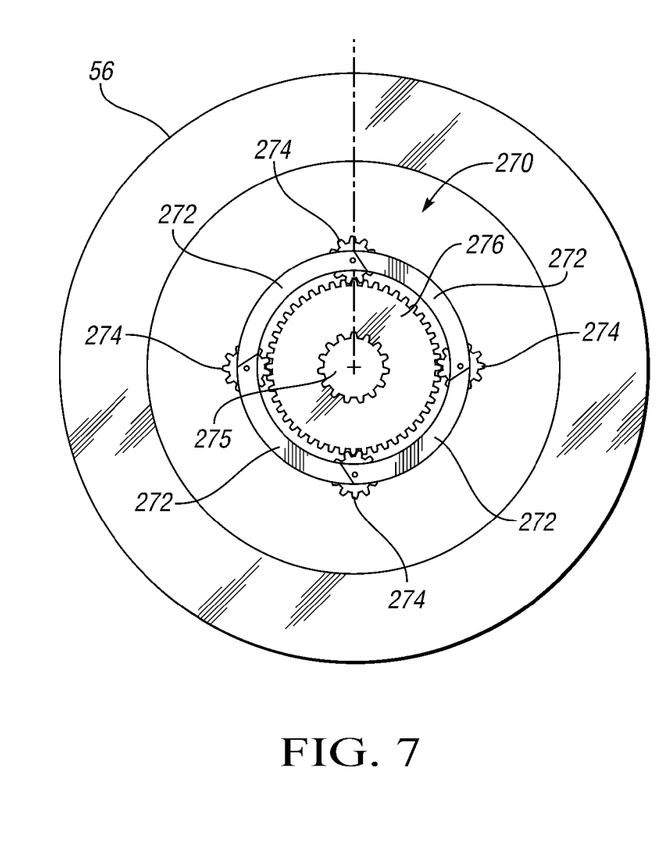
FIG. 7 is a schematic side view illustration of the rotor assembly of FIG. 2 taken at the lines 7-7 with a third embodiment of a phasing mechanism with the rotor rotating at a relatively low rotational speed or stationary.
Figure 8:
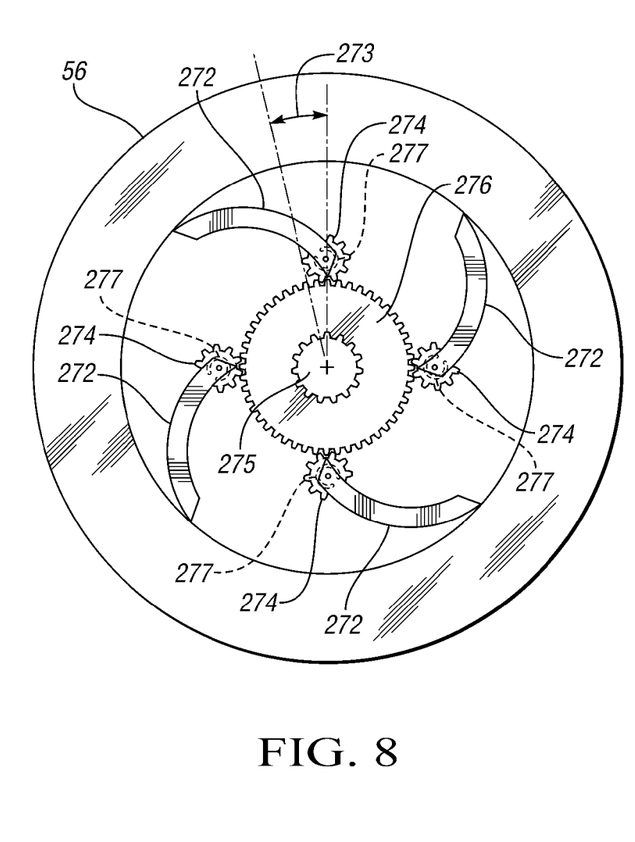
FIG. 8 is a schematic end view illustration of the rotor assembly of FIG. 7 with the rotor rotating at a relatively high rotational speed.

FIGS. 7 and 8 show another embodiment of a phaser 270 that could be used as the phasing mechanism 51 in the rotor assemblies 32, 132 in FIGS. 2 and 4 and is illustrated with respect to the rotor portion 56 of FIG. 2. The phaser 270 may be referred to as a kinematic phaser. The phaser 270 relies on centrifugal force acting upon geared masses to skew adjacent rotor portions. The phasing mechanism 51 includes geared masses 272 that are pinned at one end to pivot with planet gears 274 that are pinned to the rotor portion 56. The planet gears 274 mesh with a sun gear 276 that is splined to rotate with an extension 275 from the adjacent rotor portion 54 (shown in FIG. 2). When the rotor portions 54, 56 increase in speed, the free ends of the geared masses 272 move radially outwards due to centrifugal force, as shown in FIG. 8. This causes the planet gears 274 to rotate, but not to travel around the sun gear 276 as they are pinned at their centers. Rotation of the planet gears 274 causes the sun gear 276 to rotate. The rotor portion adjacent to rotor portion 56 (i.e., the rotor portion 54 of FIG. 2) rotates with the sun gear 276, and thus is skewed at an angle 273 relative to the rotor portion 56. The phaser 270 could also be used as the phasing mechanism 51 for the rotor assembly 132 of FIG. 4. In that case, the planet gears 274 could be pinned to the rotor portion 156 and the sun gear 276 could be connected to rotate with the rotor portion 157. The geared masses 272 move radially outwards an amount that increases as the speed of the rotor portion 56 increases. Torsion springs 277, shown only schematically, are connected at one end to the planet gears 274 and at the other end to the rotor portion 56, biasing the planet gears 274 to the position of FIG. 7 (in which the geared masses 272 are not extended). The force of the torsion springs 277 may be selected to ensure that skewing of the rotor portions 54, 56 does not occur until the rotor portions 54, 56 have reached a predetermined minimum speed at which reduction in back electromotive force is desirable.

Figure 9:
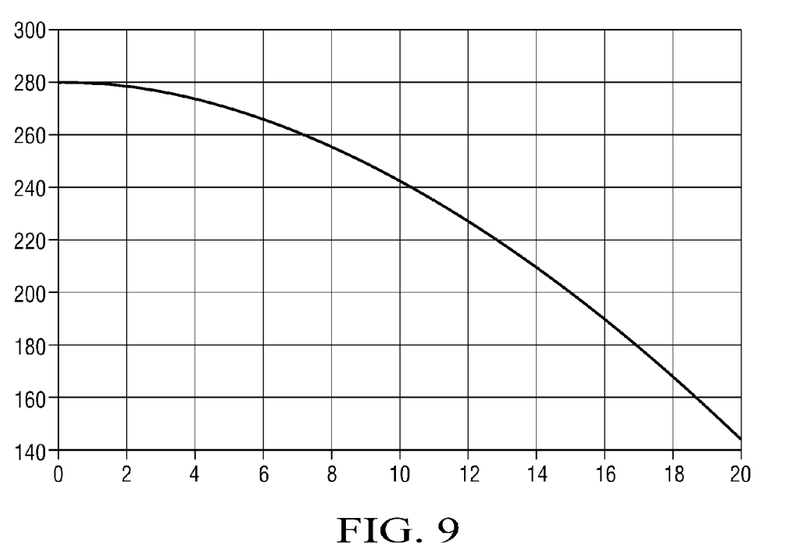
FIG. 9 is an exemplary illustration of back electromotive force versus skew angle for an electric motor assembly with phasing of rotor portions.
Figure 10:
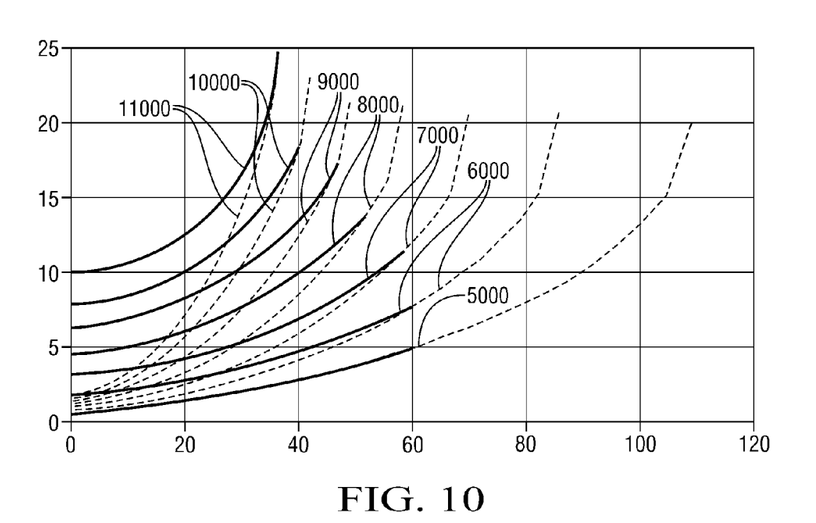
FIG. 10 is an exemplary illustration of a comparison of system power loss for an electric motor assembly versus torque loading with and without skewing of the rotor portions at various rotational speeds of the rotor portions.

FIG. 9 is an exemplary illustration of a potential reduction in back electromotive force, shown in volts on the vertical axis, with various skewing, or phasing, amounts, shown in degrees of angle on the horizontal axis, for a typical motor assembly at a rotation speed of the rotor. FIG. 10 is an exemplary illustration of system loss in watts, on the vertical axis, versus torque in newton-meters, on the horizontal axis, for various rotor speeds, with the system loss without skewing shown with solid lines for various motor speeds, and the system loss with skewing, or phasing, shown with dotted lines for the same rotor speeds.

While the best modes for carrying out the invention have been described in detail, those familiar with the art to which this invention relates will recognize various alternative designs and embodiments for practicing the invention within the scope of the appended claims.

The invention claimed is:
1. An electric motor assembly comprising:
a stator with electrical windings;
a rotor assembly rotatable about an axis of rotation and having:
a rotor hub having first and second rotor hub portions;
a rotor supported on the rotor hub, the rotor having first and second annular rotor segments with the first annu- lar rotor segment supported for rotation with the first rotor hub portion and the second annular rotor segment supported for rotation with the second rotor hub portion, each of the rotor segments having a respective set of magnets spaced circumferentially therearound;

wherein the rotor hub portions and rotor segments are configured so that at least one of the rotor segments moves about the axis of rotation relative to the other of the rotor segments as the rotor hub rotates; wherein the movement of the at least one of the rotor segments is by an amount that increases as the speed of the rotor hub increases to reduce back electromotive force;

wherein one of the rotor hub portions defines a lubrication flow channel that extends from an inner diameter of said one of the rotor hub portions to an outer diameter of said one of the rotor hub portions; wherein the first and second rotor hub portions define a cavity therebetween;

wherein the first rotor hub portion has a first set of vanes extending into the cavity; wherein the second rotor hub portion has a second set of vanes extending into the cavity; and wherein the first and second sets of vanes are configured to be pushed apart from one another when fluid is forced radially outward from the flow channel to the cavity, thereby causing the movement of the at least one rotor hub portions about the axis of rotation relative to the other of the rotor hub portions.

2. The electric motor assembly of claim 1, wherein the rotor hub and the rotor segments are configured so that the movement of the at least one of the rotor segments about the axis of rotation relative to the other of the rotor segments is due to centrifugal force.

3. The electric motor assembly of claim 1, further comprising a torsional return spring biasing the at least one of the rotor segments against the movement about the axis of rotation relative to the other of the rotor segments due to centrifugal force.

4. The electric motor assembly of claim 3, wherein the return spring is configured to prevent the movement of the at least one of the rotor hub portions about the axis of rotation relative to the other of the rotor hub portions when the rotor assembly rotates at a speed less than a predetermined speed.

5. The electric motor assembly of claim 1, wherein one of the rotor hub portions has a vent configured to vent fluid from between the rotor hub portions to reduce resistance to relative rotation of the rotor hub portions.

6. The electric motor assembly of claim 1, further comprising:
a locking pin configured to selectively lock the rotor hub portions to one another to prevent relative rotation of the rotor hub portions; and
wherein the locking pin is positioned in operative communication with the fluid such that centrifugal force causes the fluid to move the locking pin to unlock the rotor hub portions from one another.

7. The electric motor assembly of claim 6, further comprising:
a spring biasing the locking pin to lock the rotor hub portions; and wherein the spring is configured to be overcome by force of the fluid on the locking pin when the rotor hub portions reach a predetermined rotational speed.

8. A vehicle powertrain comprising:
an engine;
a transmission operatively connected to the engine and having at least one motor/generator; wherein the motor/generator includes:
a stator with electrical windings;
a rotor assembly rotatable about an axis of rotation and having
a rotor hub with first and second rotor hub portions;
a rotor supported on the rotor hub, the rotor having a first annular rotor segment supported for rotation on the first rotor hub portion, a second annular rotor segment supported for rotation on the second rotor hub portion, and an additional annular rotor segment supported for rotation on the first rotor hub portion and positioned so that the second annular rotor segment is axially between the first axial rotor segment and the additional axial rotor segment; wherein each of the rotor segments has a respective set of magnets spaced circumferentially therearound; wherein the sets of magnets cause the rotor assembly to rotate about the axis of rotation due to electrical current in the windings;
wherein the rotor hub and rotor segments are configured so that at least one of the rotor segments moves about the axis of rotation relative to the other of the rotor segments as the rotor assembly rotates, the relative movement being an amount that increases due to centrifugal force as the speed of the rotor assembly increases, the sets of magnets thereby being increasingly offset from one another as the speed of the rotor assembly increases and thereby reducing back electromotive force acting against the current in the windings.

9. The vehicle powertrain of claim 8, wherein one of the rotor hub portions defines a lubrication flow channel; and wherein the at least one of the rotor hub portions has vanes configured to cause the movement of the at least one rotor hub portions about the axis of rotation relative to the other of the rotor hub portions when lubrication fluid is forced radially outward from the flow channel to the vanes due to centrifugal force.

10. The vehicle powertrain of claim 9, further comprising return springs biasing the at least one of the rotor hub portions against the movement about the axis of rotation relative to the other of the rotor hub portions.

11. The vehicle powertrain of claim 10, wherein the return springs are configured to prevent the movement of the at least one of the rotor hub portions about the axis of rotation relative to the other of the rotor hub portions when the rotor assembly rotates at a speed less than a predetermined speed.

12. The vehicle powertrain of claim 8, wherein the rotor assembly includes:
planet gears operatively connected to the first annular rotor segment with torsion springs;
multiple masses each connected to a respective one of the planet gears and configured to move radially outward due to centrifugal force as the rotor assembly rotates;
a sun gear operatively connected for rotation with the second annular rotor segment and meshing with the planet gears so that rotation of the planet gears due to centrifugal force moving the masses radially outward as the rotor assembly rotates causes the sun gear and the second annular rotor segment to move about the axis of rotation relative to the first annular rotor segment.

13. The vehicle powertrain of claim 8, wherein the second rotor hub portion defines a lubrication flow channel that extends from an inner diameter of the second rotor hub portion to an outer diameter of the second rotor hub portion; wherein the first and second rotor hub portions define a cavity therebetween;

wherein the first rotor hub portion has a first set of vanes extending into the cavity; wherein the second rotor hub portion has a second set of vanes extending into the cavity; and wherein the first and second sets of vanes are configured to be pushed apart from one another when fluid is forced radially outward from the flow channel to the cavity, thereby causing the movement of the first rotor hub portion about the axis of rotation relative to the second rotor hub portion.

14. The vehicle powertrain of claim 8, wherein one of the rotor hub portions has a vent configured to vent fluid from between the first and second rotor hub portions to reduce resistance to relative rotation of the first and second rotor hub portions.

15. The vehicle powertrain of claim 8, further comprising:
a locking pin configured to selectively lock the first and second rotor hub portions to one another to prevent relative rotation of the first and second rotor hub portions; and
wherein the locking pin is positioned in fluid communication with the fluid such that centrifugal force causes the fluid to move the locking pin to unlock the first and second rotor hub portions from one another.

16. The vehicle powertrain of claim 15, further comprising:
a spring biasing the locking pin to lock the rotor hub portions; and wherein the spring is configured to be overcome by force of the fluid on the locking pin when the rotor hub portions reach a predetermined rotational speed.

17. An electric motor assembly comprising:
a stator with electrical windings;
a rotor assembly rotatable about an axis of rotation and having:
a rotor hub with first and second rotor hub portions;
a rotor supported on the rotor hub, the rotor having first and second annular rotor segments; wherein the first annular rotor segment is supported for rotation with the first rotor hub portion and the second annular rotor segment is supported for rotation with the second rotor hub portion; wherein each of the rotor segments has a respective set of magnets spaced circumferentially therearound;
wherein the rotor hub portions and rotor segments are configured so that at least one of the rotor segments has a flow channel through which fluid flows radially outward due to centrifugal force as the rotor hub rotates;
an annular piston with external helical gear teeth splined to the second rotor hub portion;
internal helical gear teeth connected to the second annular rotor segment;
wherein the annular piston is configured to move axially when fluid is forced radially outward from the flow channel and acts against the piston, thereby causing the second annular rotor hub segment to move about the axis of rotation relative to the first annular rotor segment as the rotor hub rotates; and wherein the movement of the second annular rotor segment is by an amount that increases as the speed of the rotor hub increases to reduce back electromotive force.

18. The electric motor assembly of claim 17, further comprising:
a spring biasing the second rotor segment to a predetermined position; and wherein the spring is configured to be overcome by force of the fluid on the annular piston when the rotor hub portions reach a predetermined rotational speed.

* * * * *